No. 870,287. PATENTED NOV. 5, 1907.
C. J. HARRIS.
VEHICLE CONSTRUCTION.
APPLICATION FILED NOV. 5, 1906.

2 SHEETS—SHEET 1.

Witnesses:
Archie B. Colbath.
Robert H. Kammler.

Inventor:
Charles J. Harris
by Emery & Booth
Attorneys

No. 870,287. PATENTED NOV. 5, 1907.
C. J. HARRIS.
VEHICLE CONSTRUCTION.
APPLICATION FILED NOV. 5, 1906.

2 SHEETS—SHEET 2.

Witnesses:
Archie B. Colbath.
Robert H. Kammler.

Inventor:
Charles J. Harris
by Emery & Booth
Attorneys

THE NORRIS PETERS CO., WASHINGTON, D. C.

UNITED STATES PATENT OFFICE.

CHARLES J. HARRIS, OF BRIDGEPORT, CONNECTICUT.

VEHICLE CONSTRUCTION.

No. 870,287.  Specification of Letters Patent.  Patented Nov. 5, 1907.

Application filed November 5, 1906. Serial No. 341,966.

*To all whom it may concern:*

Be it known that I, CHARLES J. HARRIS, a citizen of the United States, residing at Bridgeport, in the county of Fairfield and State of Connecticut, have invented an Improvement in Vehicle Construction, of which the following description, in connection with the accompanying drawings, is a specification, like letters on the drawings representing like parts.

My invention relates to vehicle construction, having for its object more particularly the provision of one or more collapsible seats in conjunction with a carriage body, such as the body of an automobile.

My invention will be best understood by reference to the following description, taken in connection with the accompanying illustration of one specific embodiment thereof, while its scope will be more particularly pointed out in the appended claims.

Figure 1:
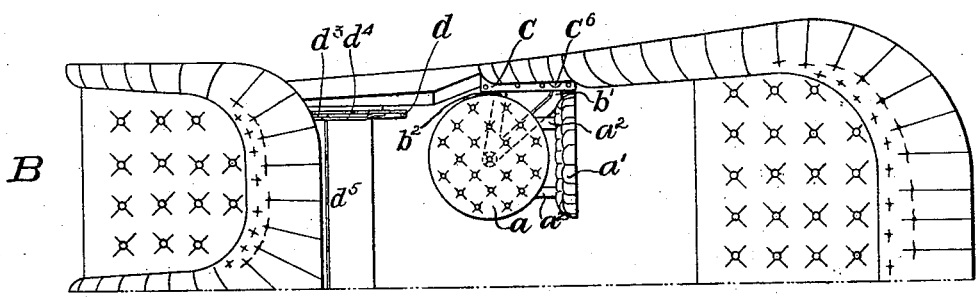
Figure 2:
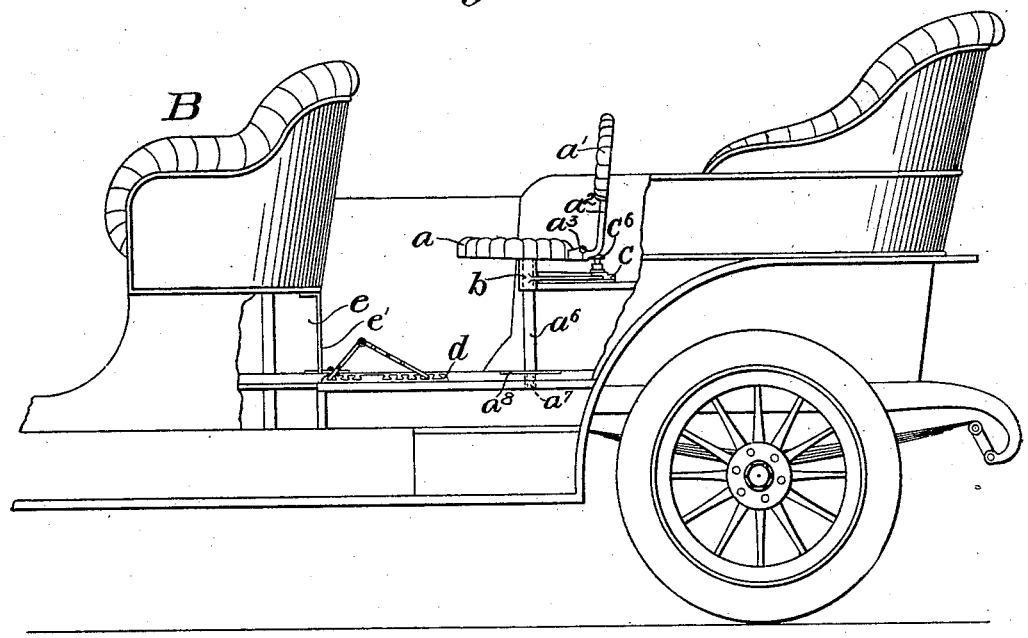
Figure 3:
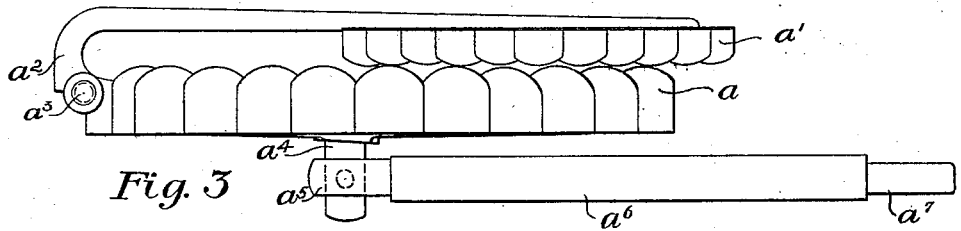
Figures 4, 5:
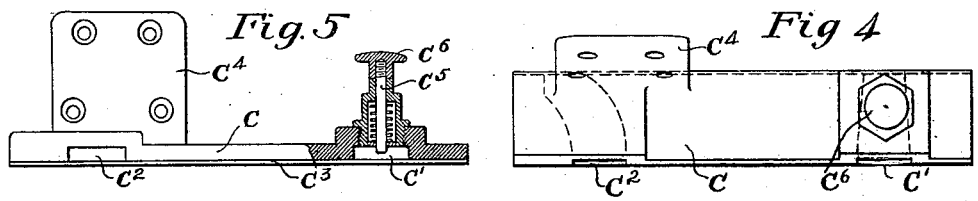
Figures 6, 7:
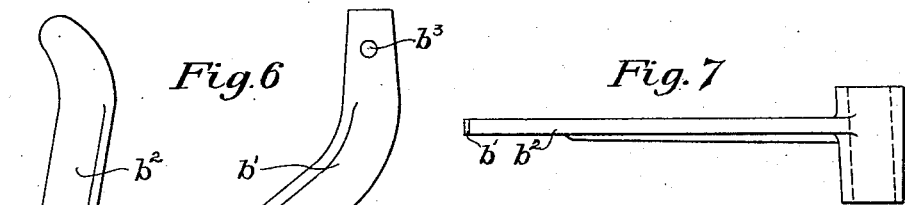
Figure 8:
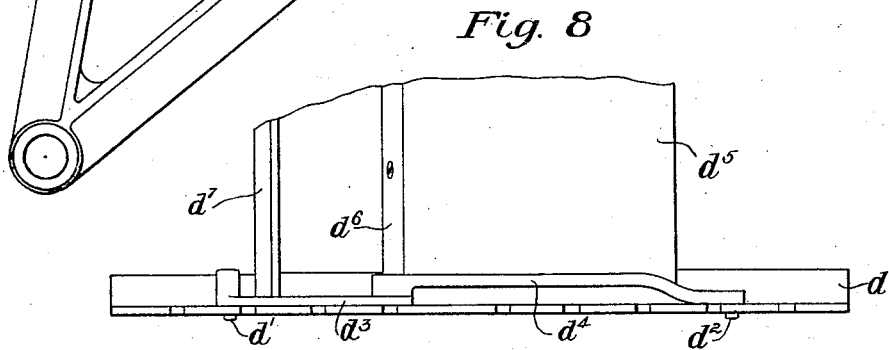
Figure 9:
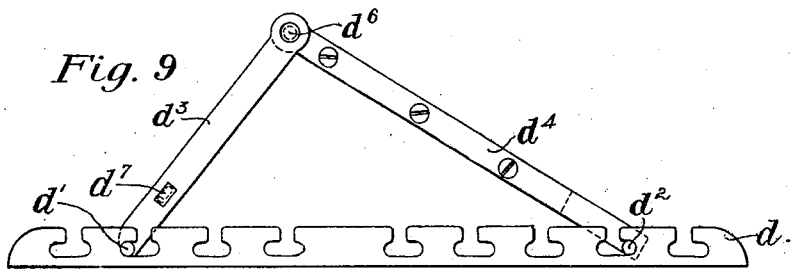

In the drawings, Figure 1 is a plan view of a portion of an automobile body showing one form of my invention. Fig. 2 is a side elevation of the same vehicle partially broken away. Fig. 3 is a side elevation, on an enlarged scale, showing the seat illustrated in Figs. 1 and 2 in its collapsed state. Fig. 4 is a plan view and Fig. 5 an elevation, the latter partially in section, showing the bracket plate. Fig. 6 is a plan and Fig. 7 an elevation of the seat bracket. Fig. 8 is a plan, partially broken away, of the collapsible foot rest, and Fig. 9 is a side elevation of the same.

Referring to the drawings, I have illustrated one form of my invention as applied to an automobile body of the side-entrance, tonneau, type, although, as will be understood, the invention is neither limited to the form or construction of seat shown nor to its application to automobile or carriage bodies or bodies of this particular form or construction.

In the present instance I have provided an auxiliary seat (of which there may be several) which may be used for increasing temporarily the seating capacity of the vehicle. This seat is not only collapsible and may be stored in a suitable storage space within the vehicle, but, when so stored leaves no objectionable evidences of its existence, such, for example, as projecting brackets or the like. Nevertheless, in the illustrated form, it provides a comfortable, convenient as well as a strong and durable, seat when placed in position.

As shown in the drawings, the seat itself comprises a suitably upholstered circular bottom portion $a$ to which is attached the upholstered back $a^1$, the latter being carried upon a pair of arms $a^2$ hinged at $a^3$ to the seat bottom so that the back may be folded over upon the bottom as shown in Fig. 3, or swung upward into an upright position at substantially right angles thereto, as shown in Figs. 1 and 2. The under side of the seat bottom is provided with a depending lug $a^4$, having flat sides upon which is swiveled the forked end $a^5$ of the supporting rod or leg $a^6$, which latter for the collapse of the seat, may be swung upward into the position shown in Fig. 3.

When the seat is placed in position the supporting rod is swung downwardly at right angles to the seat bottom and inserted through an aperture in the suitably positioned bracket $b$, which acts to hold and support the seat rod closely adjacent the seat bottom (Figs. 1 and 2). The rod has a lower reduced end $a^7$ which fits and enters a lower socket plate $a^8$ in the bottom or floor of the vehicle body so that, when in position, the seat is very rigidly held and yet may be swung about the supporting rod, as upon a pivot, to permit the person occupying the seat to face any desired direction. As shown in the drawings the seat is placed directly in front of the rear tonneau seat of the vehicle and in such fashion that the convenience and comfort of the users of the rear seat is not affected.

The underlying bracket $b$ is provided with a pair of laterally arranged and diverging supporting arms $b'$ and $b^2$, and, in order to permit the removal of all projecting seat parts when the seat is removed and stored, this bracket is removably secured in an upper fixed socket plate $c$ the latter unobtrusively fixed upon the side of the carriage body. This socket plate $c$ (Figs. 4 and 5) has a straight slot $c'$ and a curved slot $c^2$, the former being adapted to receive the straight tip of the lateral arm $b'$, and the latter the curved tip of the arm $b^2$, on the bracket $b$. The socket plate is riveted to the underlying base plate $c^3$ and the entire structure bolted or otherwise secured to any suitable side portion or side frame member of the carriage body, the upright lug $c^4$ being also provided in the present instance to more securely hold the socket plate in place.

When the bracket is placed in position the curved arm $b^2$ is first inserted in the socket slot $c^2$ and the bracket then swung into place by inserting the straight arm in its socket $c'$. To retain the straight bracket arm in place there is provided over the socket opening $c'$ the spring-pressed latch pin $c^5$, having a lifting head $c^6$. When the bracket arm enters the socket the pin snaps into an opening $b^3$ in the same, locking the bracket in place. To remove the bracket the latter is first unlatched by lifting the latch pin $c^5$. If desired, even the socket plate may be so enveloped in upholstery that its presence will to the ordinary observer remain unnoticed.

While a collapsible seat of the type described may be employed without any special foot-rest, I have herein also provided a collapsible foot-rest which may be used to coöperate with the described seat, although the foot-rest has features of novelty making it applicable to seats of usual construction and to bodies of other form than shown in the drawings, so that the invention, as it relates to the said foot-rest, is not limited to the particular application here made of the same. For this purpose there is provided at each sill of the carriage body a notched plate $d$ (Figs. 1, 2, 8 and 9) having two sets of notches with which there may be engaged the lugs or pins $d'$ and $d^2$ provided upon the lower ends of the supporting links $d^3$ and $d^4$ respectively. The two opposite links $d^3$ have to hold between them the foot-board rest $d^5$ and are hinged at their upper or opposite ends to the cross rod $d^6$, the links $d^3$ being also connected by the cross brace $d^7$. It therefore follows that the foot rest may be set up as shown in Figs. 2 and 9, with the foot-board presented to the user of the collapsible seat. By placing the lug in different notches both the position and angle of the foot-rest may be changed so that it may not only be inclined as the comfort of the user directs, but may be laid flat on the floor while still engaging the notched plates and by them firmly held. When the seat is folded up flat and stored, the hinged foot-rest may also be removed from the notched plates and placed out of sight with the seat, leaving therefore no projecting or visible parts remaining.

The lugs enter the undercut portions of the notches, as shown through the narrow contracted openings, so that when the rest is in use each lug is pressed into the undercut portion of its notch and effectually held against escape or displacement by jolting. This effect, that is to say, the firmness with which the rest is maintained in position is further increased by inclining the undercut portion of each set of openings or notches slightly downward toward the nearest end of the plate $d$ so that the lugs tend to settle into the depressed ends of the notches and upon and against the adjacent floor covering, thus avoiding the natural tendency to rattling when foot pressure is placed on the rest.

While the seat and the auxiliary parts may be stored in any convenient place, in the present instance there is provided a storage compartment $e$ immediately beneath the front seat B of the vehicle, this compartment being reached through the removable or hinged cover $e'$.

While I have shown and described one form of my invention and have illustrated the same in detail, it is to be understood that this invention is not limited to the form or relative arrangement or construction of the parts described, or to the application of the invention here made, but that extensive modifications may be made in the illustrated embodiment of the invention without departing from the spirit thereof.

Claims.

1. An automobile having a body of the tonneau type and provided with a collapsible seat construction, the same comprising a seat bottom having a hinged back and a centrally hinged supporting rod, an underlying bracket adjacent the seat bottom and through which said rod passes, said bracket having laterally diverging arms, one provided with a straight end and the other with a curved end, a socket at the floor of the body for receiving the lower portion of the supporting rod, a socket plate secured to a side member of the vehicle body, said socket plate comprising a curved socket and a straight socket in which the curved and straight ended arms of the bracket respectively are removably secured and a spring pressed latching pin for retaining the straight ended arm in its socket.

2. An automobile having a body of the tonneau type and provided with a collapsible seat construction, the same comprising a seat bottom having a hinged back and a centrally hinged supporting rod, an underlying bracket adjacent the seat bottom and through which said rod passes, said bracket having laterally diverging arms, one provided with a straight end and the other with a curved end, a socket at the floor of the body for receiving the lower portion of the supporting rod, and a socket plate secured to a side member of the vehicle body, said socket plate comprising a curved socket and a straight socket in which the curved and straight ended arms of the bracket respectively are removably secured.

3. An automobile having a body of the tonneau type and provided with a removable and collapsible seat construction, the same comprising a seat bottom having a hinged back and a centrally hinged supporting rod, an underlying bracket adjacent the seat bottom and through which said rod passes, for removably securing said seat bottom upon said bracket said bracket having laterally diverging arms, one provided with a straight end and the other with a curved end, a socket at the floor of the body for receiving the lower portion of the supporting rod, a socket plate secured to a side member of the vehicle body, said socket plate comprising a curved socket and a straight socket in which the curved and straight ended arms of the bracket respectively are removably secured.

4. An automobile having a body of the tonneau type and provided with a collapsible seat construction, the same comprising a seat bottom having a hinged back and a centrally hinged supporting rod, an underlying bracket adjacent the seat bottom and through which said rod passes, said bracket having laterally diverging arms, one provided with a straight end and the other with a curved end, a socket at the floor of the body for receiving the lower portion of the supporting rod, a socket plate secured to a side member of the vehicle body, said socket plate comprising a curved socket and a straight socket in which the curved and straight ended arms of the bracket respectively are removably secured and a foot-rest to coöperate with said collapsible seat having means to permit of its adjustment towards and from the latter.

5. A carriage body provided with a collapsible seat construction, the same comprising a seat bottom having a hinged back and a hinged supporting rod, an underlying bracket adjacent the seat bottom, in which bracket the rod is removably held and supported, means for removably supporting the bracket upon the carriage body, and a socket at the carriage floor for receiving the end of the seat supporting arm.

6. A carriage body having a removable seat comprising a seat bottom, a folding back, a folding leg and removable bracket to hold the leg near the seat bottom, and means also to hold the leg near its lower end.

7. A carriage body of the tonneau type having a main seat, a collapsible and removable seat mounted at one side of the tonneau and in front of the main seat, a foot-rest adjustably mounted upon the floor of the tonneau body for movement towards or from said removable seat, and the means for supporting said seat comprising removable bracket to hold the seat in place.

8. A carriage body having a seat, a depending leg, a bracket for removably holding the leg, said bracket having diverging laterally extending arms, and a socket plate in which the arms are removably secured.

9. A carriage body having a collapsible auxiliary seat and a removable seat holder, said seat and holder having coöperating disengageable members for retaining said seat in seating position and to permit its ready removal from said holder.

10. A carriage body provided with a main seat, a removable seat having means for supporting it in front of the main seat and at the side of said carriage, an adjustable foot rest, supported adjacent the floor of said carriage body and in front of said seats and comprising a pair of notched plates each mounted at one side of the floor of said carriage for supporting said foot rest, said foot rest comprising collapsible jointed members having means for temporarily engaging the notches of said plates.

11. An automobile body of the tonneau type having front and rear seats and a collapsible auxiliary seat and foot rest means arranged in the space between said seats provided with means for respectively securing the same upon the side and floor of said body and to permit their convenient removal.

12. A carriage body provided with a collapsible seat comprising a bottom or seat member, a hinged back and a folding leg, and supporting means in which said leg is swiveled.

13. An automobile having a body of the tonneau type, a removable collapsible seat, means including a socket plate and a disengageable seat supporting bracket for placing the seat in position in front of the rear seat of the tonneau.

14. An automobile body having a removable collapsible auxiliary seat, a removable projecting seat holding member for maintaining the seat in position, and a support on the carriage body provided with latching means for removably securing said holding member thereto.

15. An automobile body having a fixed support $c$ secured thereto, a removable seat supporting bracket $b$ having means for readily applying it to and supporting it from and permitting it to be readily removed from said fixed support, and an auxiliary seat $a$, said seat and bracket having coöperating portions for retaining said seat in seating position upon said bracket and for permitting its ready removal from said bracket.

16. An automobile body having a fixed support $c$ secured thereto, a removable seat supporting bracket $b$ having means for readily applying it to and supporting it from and permitting it to be readily removed from said fixed support, and an auxiliary seat $a$, said seat having a rod $a^6$ for retaining said seat in seating position upon said bracket and for permitting its ready removal from said bracket.

In testimony whereof, I have signed my name to this specification, in the presence of two subscribing witnesses.

CHARLES J. HARRIS.

Witnesses:
E. F. RUSSELL,
J. R. STINE.